(12) United States Patent
Kundu et al.

(10) Patent No.: US 12,456,148 B2
(45) Date of Patent: Oct. 28, 2025

(54) DEVICES, SYSTEMS, AND METHODS FOR AUTHENTICATING AN ACCOUNT FOR TRANSACTING ON CRYPTOCURRENCY EXCHANGES

(71) Applicant: Visa International Service Association, San Francisco, CA (US)

(72) Inventors: Shibabrata Sanjib Kundu, West Bengal (IN); Sandipa Das, West Bengal (IN); Varadharajan Seshadri, Tamilnadu (IN); Bhuvaneswari Govindan, Tamilnadu (IN)

(73) Assignee: Visa International Service Association, San Francisco, CA (US)

( * ) Notice: Subject to any disclaimer, the term of this patent is extended or adjusted under 35 U.S.C. 154(b) by 321 days.

(21) Appl. No.: 18/048,063

(22) Filed: Oct. 20, 2022

(65) Prior Publication Data

US 2024/0135447 A1   Apr. 25, 2024
US 2024/0233013 A9   Jul. 11, 2024

(51) Int. Cl.
*G06Q 40/04* (2012.01)
*G06Q 20/38* (2012.01)
*G06Q 20/40* (2012.01)
*G06Q 20/42* (2012.01)

(52) U.S. Cl.
CPC ......... *G06Q 40/04* (2013.01); *G06Q 20/3821* (2013.01); *G06Q 20/389* (2013.01); *G06Q 20/4014* (2013.01); *G06Q 20/42* (2013.01); *G06Q 2220/00* (2013.01)

(58) Field of Classification Search
CPC .. G06Q 40/04; G06Q 20/3821; G06Q 20/289; G06Q 20/4014; G06Q 20/42; G06Q 2220/00

USPC .......................................................... 705/37
See application file for complete search history.

(56) References Cited

U.S. PATENT DOCUMENTS

| | | | |
|---|---|---|---|
| 10,373,129 B1 * | 8/2019 | James | H04L 9/06 |
| 11,200,569 B1 * | 12/2021 | James | G06Q 20/381 |
| 2019/0325473 A1 * | 10/2019 | Swamidurai | H04L 9/50 |
| 2021/0241266 A1 * | 8/2021 | Kamal | G06Q 20/40145 |
| 2021/0350343 A1 * | 11/2021 | Gaur | G06Q 20/027 |
| 2022/0084015 A1 * | 3/2022 | Fawzy | G06Q 20/3672 |

FOREIGN PATENT DOCUMENTS

| | | |
|---|---|---|
| CN | 111147432 A | 5/2020 |
| EP | 3821572 A1 | 1/2020 |
| WO | 2020014399 A1 | 1/2020 |

* cited by examiner

Primary Examiner — Lindsay M Maguire
(74) Attorney, Agent, or Firm — K&L Gates LLP

(57) ABSTRACT

A method of rapidly onboarding a user for access to trade on a cryptocurrency exchange via a payment network is disclosed herein. The method can include receiving an application program interface ("API") call including a request to authenticate the user for access to trade on the cryptocurrency exchange, wherein the request includes information associated with an account of the user, transmitting the request to an issuer system associated with the account, receiving a verification result from the issuer system, wherein the verification result is based on user identifying information previously authenticated by the issuer system in association with the account, wherein the verification result is indicative of an authenticity status of the user, and responding to the request by transmitting an indication of the verification result to the cryptocurrency exchange.

20 Claims, 8 Drawing Sheets

DEVICES, SYSTEMS, AND METHODS FOR AUTHENTICATING AN ACCOUNT FOR TRANSACTING ON CRYPTOCURRENCY EXCHANGES

TECHNICAL FIELD

The present disclosure is generally related to dynamic information storage and retrieval and, more particularly, is directed to the selection, storage, retrieval, and provision of customer identifying information to authorize the customer for access to a cryptocurrency exchange.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method of rapidly onboarding a user for access to trade on a cryptocurrency exchange via a payment network is disclosed. The method can include receiving an application program interface ("API") call including a request to authenticate the user for access to trade on the cryptocurrency exchange, wherein the request includes information associated with an account of the user, transmitting the request to an issuer system associated with the account, receiving a verification result from the issuer system, wherein the verification result is based on user identifying information previously authenticated by the issuer system in association with the account, wherein the verification result is indicative of an authenticity status of the user, and responding to the request by transmitting an indication of the verification result to the cryptocurrency exchange.

In various aspects, a payment network configured to rapidly onboard a user for access to trade on a cryptocurrency exchange is disclosed. The payment network can include a processor, and a memory configured to store an application program interface ("API") and instructions that, when executed by the processor, cause the payment network to receive an API call including a request to authenticate the user for access to trade on the cryptocurrency exchange, wherein the request includes information associated with an account of the user, wherein the account is associated with the payment network, transmit the request to an issuer system associated with the account, receive a verification result from the issuer system, wherein the verification result is based on user identifying information previously authenticated by the issuer system in association with the account, wherein the verification result is indicative of an authenticity status of the user, receive a confirmation that the user had previously authorized the previously authenticated user identifying information to be used for alternate verification purposes, and respond to the request by transmitting an indication of the verification result to the cryptocurrency exchange.

In various aspects, a system configured to rapidly onboard a user for access to trade on a cryptocurrency exchange is disclosed. The system can include a computing device, and a payment network including a processor, and a memory configured to store an application program interface ("API") configured to communicate with the computing device an issuer system and instructions that, when executed by the processor, cause the payment network to receive an API call including a request to authenticate the user for access to trade on the cryptocurrency exchange from the computing device, wherein the request includes information associated with an account of the user, wherein the account is associated with the payment network, transmit the request to an issuer system associated with the account, receive a verification result from the issuer system, wherein the verification result is based on user identifying information previously authenticated by the issuer system in association with the account, wherein the verification result is indicative of an authenticity status of the user, and respond to the request by transmitting an indication of the verification result to the cryptocurrency exchange.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure or claimed subject matter.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Figure 1:
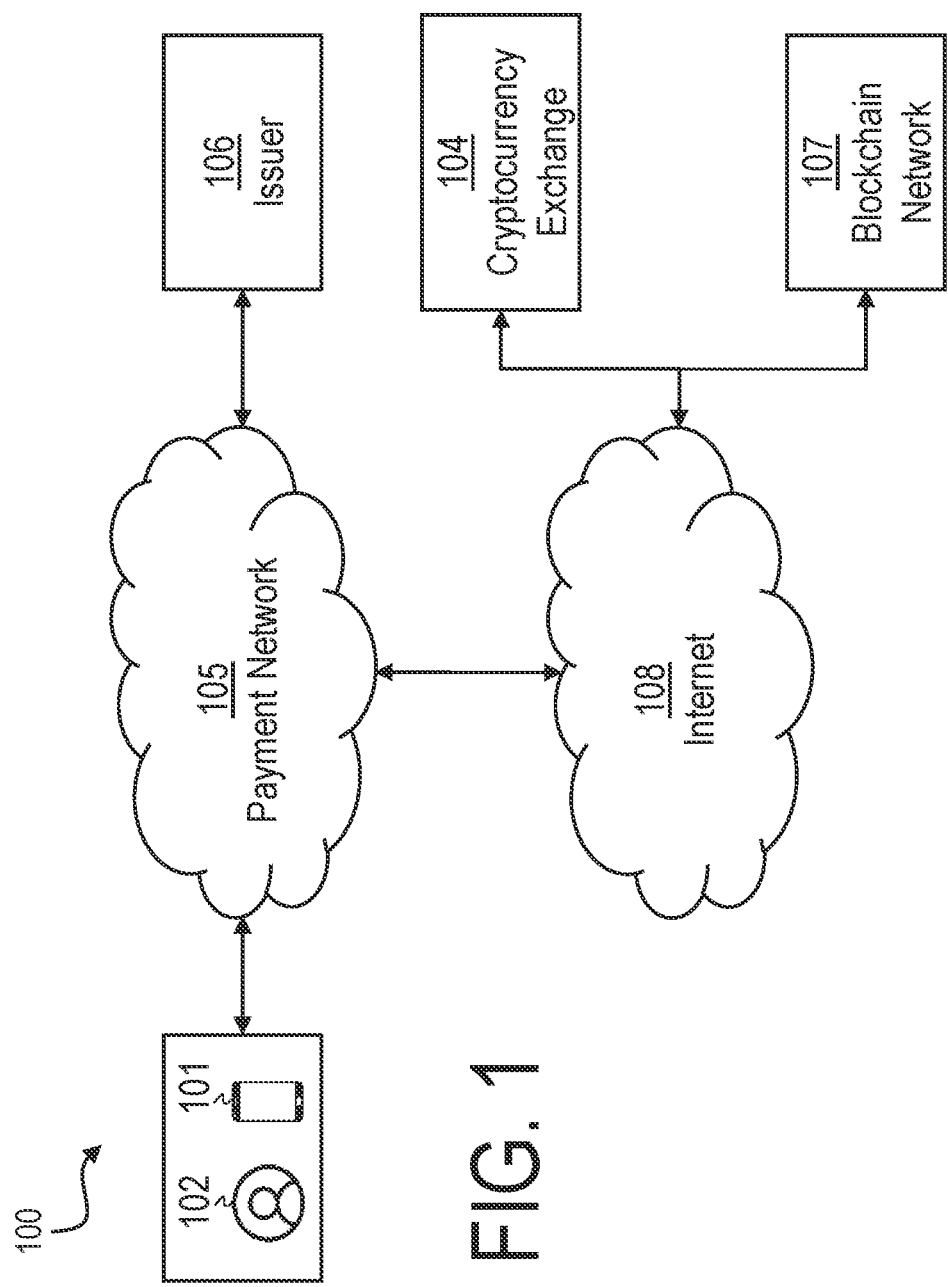
FIG. 1 illustrates a block diagram of a system configured to authenticate an account for transacting on a cryptocurrency exchange, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of the claimed subject matter in any manner.

DESCRIPTION

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims.

In the following description, like reference characters designate like or corresponding parts throughout the several views of the drawings.

Before discussing specific aspects and examples, some descriptions of terms used herein are provided below.

An "authorization request message" may be an electronic message that is sent to a payment processing network and/or an issuer of a payment account to request authorization for a payment transaction. An authorization request message according to some aspects may comply with International Organization for Standardization (ISO) 8583, which is a standard for systems that exchange electronic transaction information associated with a payment made by a consumer using a payment device or a payment account. An ISO 8583 message includes a message type indicator, one or more bitmaps indicating which data elements are present in the message, and data elements of the message. The authorization request message may include an issuer account identifier that may be associated with a payment device or payment account. An authorization request message may be generated by an acceptance device or a server and may be sent to an issuing financial institution directly or through a payment network. In some aspects of the present disclosure, an authorization request message may include a payment token, an expiration date, a token presentment mode, a token requestor identifier, a token cryptogram, a token assurance level, and data used to generate the token assurance level. The payment token may include a payment token issuer identifier that may be a substitute for a real issuer identifier for an issuer. For example, the real issuer identifier may be part of a BIN range associated with the issuer. An authorization request message may also comprise additional data elements corresponding to "identification information" including, for example, a service code, a CVV or CVC (card verification value or code), a dCVV or dCVC (dynamic card verification value or code), token cryptogram, an expiration date, etc. An authorization request message may also comprise "transaction information," such as any information associated with a current transaction (e.g., the transaction amount, merchant identifier, merchant location, etc.) as well as any other information that may be utilized in determining whether to identify and/or authorize a payment transaction.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some aspects of the present disclosure, the server computer may provide and/or support payment network cloud service.

The terms "issuer institution," "portable financial device issuer," "issuer," or "issuer bank" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions), such as initiating credit and/or debit payments. For example, an issuer may provide an account identifier, such as a personal account number (PAN), to a user that uniquely identifies one or more accounts associated with the user. The account identifier may be used by the user to conduct a payment transaction. The account identifier may be embodied on a portable financial device, such as a physical financial instrument, e.g., a payment card, and/or may be electronic and used for electronic payments. In some non-limiting aspects of the present disclosure, an issuer may be associated with a bank identification number (BIN) that uniquely identifies the issuer. As used herein "issuer system" or "issuer institution system" may refer to one or more systems operated by or operated on behalf of an issuer. For example, an issuer system may refer to a server executing one or more software applications associated with the issuer. In some non-limiting aspects of the present disclosure, an issuer system may include one or more servers (e.g., one or more authorization servers) for authorizing a payment transaction.

An "issuer" can include a payment account issuer. The payment account (which may be associated with one or more payment devices) may refer to any suitable payment account (e.g., credit card account, a checking account, a savings account, a merchant account assigned to a consumer, or a prepaid account), an employment account, an identification account, an enrollment account (e.g., a student account), etc.

A "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

A "key" may refer to a piece of information that is used in a cryptographic algorithm to transform input data into another representation. An exemplary encryption key may include a master derivation key (MDK) which may be used to generate a limited use key (LUK) that is provided to a computer device of a user. An LUK can be an encryption key that is intended for limited use (e.g., a limited number of transactions or a limited time period) and is not intended to be used for the lifetime of an account. Further details regarding LUKs can be found in U.S. Published Patent Application No. 2015/0180836, which is herein incorporated by reference in its entirety and is assigned to the same assignee as the present application. The MDK may be used to generate and provision the token, as well as, authenticate the token when used in authorization processing by validating static and variable transaction data.

A "cryptographic algorithm" can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. Encryption techniques may include symmetric and asymmetric encryption techniques.

A "user device" is an electronic device that may be transported and/or operated by a user. A user device may provide remote communication capabilities to a network. The user device may be configured to transmit and receive data or communications to and from other devices. In some aspects of the present disclosure, the user device may be portable. Examples of user devices may include mobile phones (e.g., smart phones, cellular phones, etc.), PDAs, portable media players, wearable electronic devices (e.g., smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. An "application" may be computer code or other data stored on a computer readable medium (e.g., memory element or secure element) that may be executable by a processor to complete a task.

"Authentication" is a process by which the credential of an endpoint (including but not limited to applications, people, devices, process, and systems) can be verified to ensure that the endpoint is who they are declared to be.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting aspects of the present disclosure, a message may refer to a packet (e.g., a data packet, a network packet, and/or the like) that includes data. It will be appreciated that numerous other arrangements are possible.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices (e.g., processors, servers, client devices, software applications, components of such, and/or the like).

As used herein, a "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g., when a device has remote access to a network by tethering to another device—e.g., using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting aspects of the present disclosure, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some aspects of the present disclosure, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

"Payment credentials" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CW2 (card verification value 2), CVC3 card verification values, etc. CW2 is generally understood to be a static verification value associated with a payment device. CW2 values are generally visible to a user (e.g., a consumer), whereas CW and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, an "electronic wallet" or "digital wallet" or "mobile wallet" can store user profile information, payment information (including tokens), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A "digital wallet" can include an electronic device that allows an individual to conduct electronic commerce transactions. A digital wallet may be designed to streamline the purchase and payment process. A digital wallet may allow the user to load one or more payment cards onto the digital wallet so as to make a payment without having to enter an account number or present a physical card.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device.

As used herein, "identification information" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

The term "transaction data" may include any data associated with one or more transactions. In some aspects of the present disclosure, the transaction data may merely include an account identifier (e.g., a PAN) or payment token. Alternatively, in other aspects of the present disclosure, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

A "user" may include an individual. In some aspects of the present disclosure, a user may be associated with one or more personal accounts and/or mobile devices. The user may also be referred to as a cardholder, account holder, or consumer.

An "acquirer" may refer to an entity licensed by the transaction service provider and/or approved by the transaction service provider to originate transactions (e.g., payment transactions) using a portable financial device associated with the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

Reference to "a device," "a server," "a processor," and/or the like, as used herein, may refer to a previously recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor ("DSP"), programmable logic device ("PLD"), programmable logic array ("PLA"), or field programmable gate array ("FPGA"), state machine circuitry, firmware that stores instructions executed by programmable circuitry, and any combination thereof. The control circuit may, collectively or individually, be embodied as circuitry that forms part of a larger system, for example, an integrated circuit ("IC"), an application-specific integrated circuit ("ASIC"), a system on-chip ("SoC"), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof. Additionally, it shall be appreciated that, as referenced herein, any specific type of control circuit can be effectively interchanged with any of the control circuits described above.

Before explaining various aspects of the devices, systems, and methods disclosed herein in further detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Cryptocurrencies are digital assets tracked via distributed ledgers that are hosted by various blockchain networks that use various proofs and methods of cryptography to secure the ledger and ensure its accuracy. Since the inception of Bitcoin, then general public's interest in trading cryptocurrencies has steadily increased and become a part of the cultural zeitgeist. Indeed, more and more institutional investors are pursuing exposure to cryptocurrencies, as are individuals seeking to profit from the growing number of applications presented by blockchain-based technologies. For example, presently, there are thousands of cryptocurrencies (e.g., Bitcoin, Ethereum, Cardano, Polygon, Polkadot, Internet Computer Protocol, Dogecoin, etc.) available to trade on hundreds of cryptocurrency exchanges (e.g., Binance, Coinbase, CEX.io, Kraken, Gemini, etc.).

Although the anonymity provided by cryptocurrency initially inspired many exchanges to rebuff user identification policies, recent developments regarding its governmental regulation have resulted in an adoption of user authentication policies and protocols by many of the most popular exchanges. Thus, prior to using a cryptocurrency exchange, it is likely that a user will have to provide certain identification documents, such as know your customer ("KYC") documents (e.g., voter identification cards, passports, drivers' licenses, government issued photo identification card, etc.), which must be authenticated before the user can trade cryptocurrencies via the exchange. Such authentication protocols can be cumbersome and time-consuming, taking as long as two or three days before the user can access the exchange. Additionally, such authentication protocols can be perceived as overly-invasive by some users, due to the required provision of sensitive information to the exchange—an entity that may be an unknown and untrusted by new users. In other words, by employing conventional protocols, many exchanges may be inhibiting mass adoption and losing new users, whom may already be skeptical of cryptocurrencies, which are commonly perceived to be unconventional and volatile assets. Accordingly, there is a need for improved devices, systems, and methods for authenticating an account for transacting on a cryptocurrency exchange.

Referring now to FIG. 1, a block diagram of a system 100 configured to authenticate an account for transacting on a cryptocurrency exchange is depicted in accordance with at least one non-limiting aspect of the present disclosure. According to the non-limiting aspect of FIG. 1, the system 100 can include a payment network 105, an issuer system 106, a cryptocurrency exchange 104 one or more of which may be hosted on and/or include one or more servers operated by one or more entities, for example. Other possible configurations for the systems configured to achieve a similar result as the system 100 of FIG. 1 are contemplated by the present disclosure. Such configurations may include fewer or more entities, each of which may perform some or all of the tasks of the others, and may be owned or operated by various entities, including merchants, payment networks, and financial institutions. As such, the system 100 of FIG. 1 is merely an illustrative example. Also for illustrative purposes, communications between various components of the system 100 of FIG. 1 are shown as bi-directional, meaning information can be exchanged to and from each component. In some aspects, one or more of the communications can be unidirectional.

According to the non-limiting aspect of FIG. 1, the system 100 can enable a user 102 to communicate with a payment network 105 and/or cryptocurrency exchange 104 using a computing device 101. The computing device 101 of FIG. 1 is a mobile computing device, which may be a smartphone, portable computer, smart-watch or other wearable, and/or any other device configured to access account information (e.g., payment credentials, etc.). However, according to other non-limiting aspects, the computing device 101 can include a personal computer, server, or any other device that would not be mobile in the traditional sense. Communications can be sent to and from various components of the system 100 via the internet 108. For example, the payment network 105 can be configured to communicate with the cryptocurrency exchange 104 and/or a blockchain network 107, as will be described in further detail in reference to FIG. 2. Moreover, the payment network 105 can implement an application programming interface ("API") configured to enable communication between various applications deployed by the various components of the system 100, such as the computing device 101, the cryptocurrency exchange 104, the issuer system 106, and/or the blockchain network 107.

For example, the API can be stored in a memory of a server of the payment network 105 and, along with instructions also stored in the memory, can cause the one or more servers of the payment network 105 to perform the methods disclosed herein. For example, via the computing device 101, the user 102 can initiate API calls including information and requests that the payment network 105 can coordinate to resolution on behalf of the user 102 (FIG. 1). Additionally, the payment network 105 can allow the API to be called by various third parties and/or third party entities and/or products (e.g., exchange mobile applications, websites, digital wallets, banks, merchants, etc.), including the cryptocurrency exchange 104, to request the transmission of certain information and/or communications necessary to authenticate the user for access to the cryptocurrency exchange 104, as will be described in more detail with reference to FIGS. 5A-5C.

As depicted in FIG. 1, the computing device 101 can be communicably coupled to the payment network 105 and configured to communicate with the payment network 105 via the aforementioned API. For example, according to some non-limiting aspects, via an integration of the API within a mobile application or website executed or accessed by the computing device 101, a user can be prompted to upload identifying information to the system 100, as will be described in further detail with reference to FIG. 4. Once uploaded via the API, the user identifying information can be transmitted to any other components of the system 100 depicted in FIG. 1, including the issuer system 106 and/or the cryptocurrency exchange 104. In other words, the payment network 105 can be particularly configured, for example via one or more APIs, to facilitate a secure communication between components of the system 100.

It shall be appreciated that, although the system 100 of FIG. 1 includes a cryptocurrency exchange 104, the system 100 can be similarly applied to authenticate a user for any other system and/or service that would otherwise require and/or regulate the authentication of a user prior to enabling them to access the system and/or service. For example, the system 100 of FIG. 1 can be similarly beneficial to improve user 102 access to use of traditional stock exchanges, banks, credit unions, wealth management firms, broker-dealers, finance tech applications (fintech apps), travel security programs, background checks, private lenders and/or lending platforms, amongst other applications where it might be beneficial to confirm the identity and/or address of a user 102.

Figure 2:
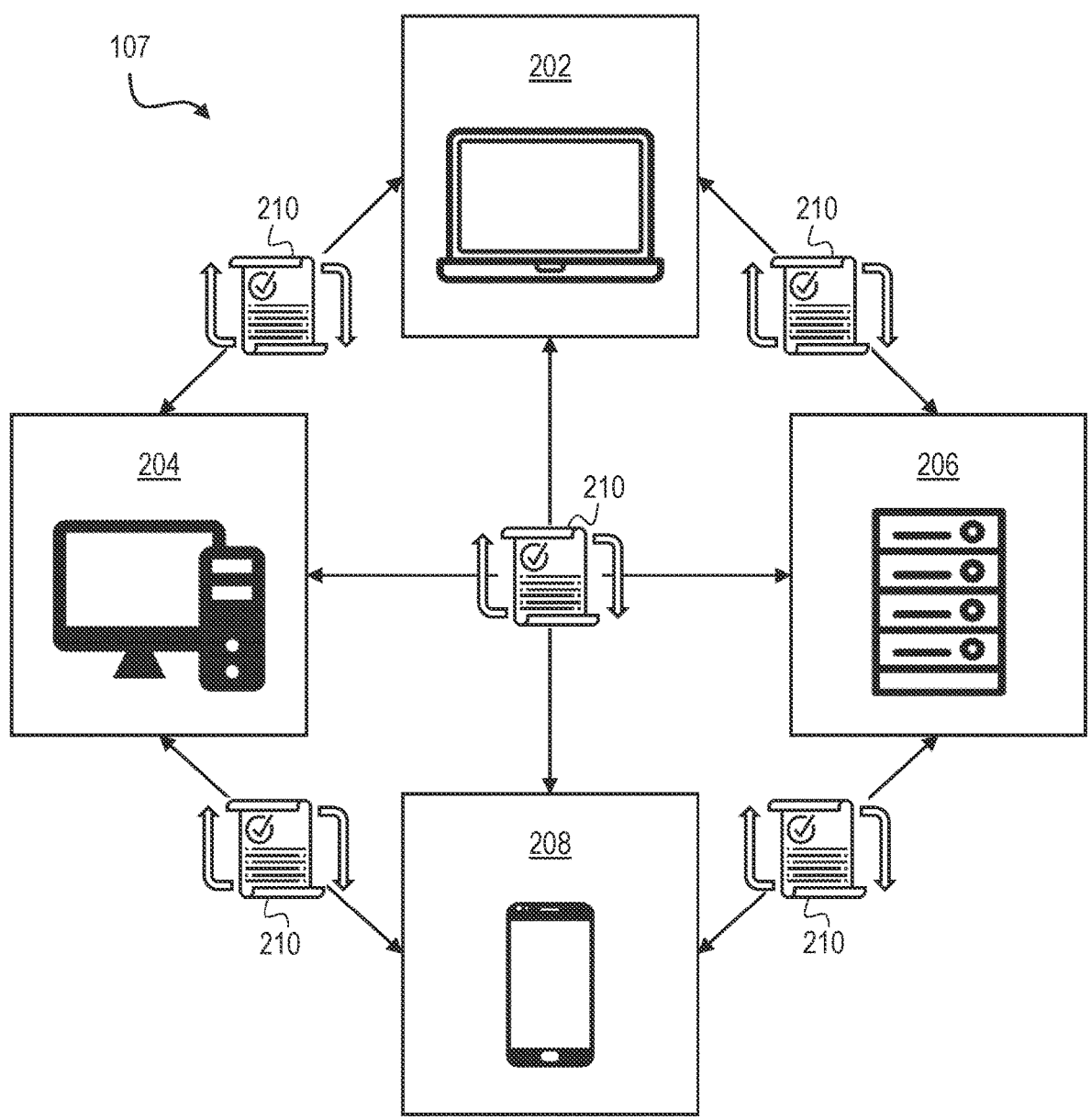
FIG. 2 illustrates a block diagram of a system for implementing a blockchain network configured to interface with the cryptocurrency exchange of the system of FIG. 1, in accordance with at least one non-limiting aspect of the present disclosure.

Referring now to FIG. 2, a block diagram of a system for implementing a blockchain network 107 configured to interface with the cryptocurrency exchange 104 (FIG. 1) of the system 100 of FIG. 1 and facilitate the acquisition and trading of digital assets is depicted, in accordance with at least one non-limiting aspect of the present disclosure. According to the non-limiting aspect of FIG. 2, the blockchain network 107 can include one or more nodes 202, 204, 206, 208 configured to interact with each other such that the nodes 202, 204, 206, 208 can collectively host, modify, and verify a distributed ledger 210. For example, according to the non-limiting aspect of FIG. 2, the blockchain network 107 can include one or more laptop computers at node 202, personal computers at node 204, servers at node 206, and/or mobile computing devices at node 208, such as a smart phone and/or a tablet. However, it shall be appreciated that the non-limiting aspect of FIG. 2 is merely illustrative. As such, the blockchain network 107 can include any number and/or type of nodes 202, 204, 206, 208 necessary to effectively host, modify, and verify a distributed ledger 210. Moreover, certain privileges associated with the distributed ledger 210 can be selectively allocated to certain nodes 202, 204, 206, 208 of the blockchain network 107. For example, most nodes may be configured only to verify or validate the distributed ledger 210, while a select number of nodes may have the ability to modify the distributed ledger 210 and/or generate new blocks.

According to the non-limiting aspect of FIG. 2, the distributed ledger 210 can include records of transactions conducted between accounts associated with the blockchain network 107. For example, the distributed ledger 210 can include records associated with transactions executed via smart contracts, or code that automatically executes all components of an agreement that is then stored in the distributed ledger 210. The code itself can be replicated across the multiple nodes 202, 204, 206, 208 of a blockchain network 107 and, therefore, the distributed ledger 210 and its records benefit from the security, permanence, and immutability provided by the blockchain network 107. Notably, the blockchain network 107 can include any foundational, "layer two," or tributary chain, including chains such as the Bitcoin blockchain, Ethereum, Polygon, Arbitrum, and/or Loopring, amongst others.

In further reference to FIG. 2, a user operating a user device (e.g., one of the nodes 202, 204, 206, 208) or a computing device in communication with a node 202, 204, 206, 208, can initiate a transaction by generating a cryptographically signed message and sending the message to blockchain network 107. The message can include transaction data such as information pertaining to an object of the transaction (e.g., a cryptocurrency, a NFT, etc.), a recipient, and/or an amount associated with the transaction, amongst other information. Once a node 202, 204, 206, 208 receives the message, the node 202, 204, 206, 208 can distribute the message to the other nodes 202, 204, 206, 208 in the blockchain network 107.

According to some non-limiting aspects, each of the nodes 202, 204, 206, 208 of the blockchain network 107 can include the transaction represented in the generated message in a block of other transactions and can attempt to validate or cryptographically solve the block. The first node 202, 204, 206, 208 that solves the block can provide the solution to the other validation nodes for verification, and ledger 210 maintained at each of the nodes 202, 204, 206, 208 can be updated to add the block to the distributed ledger 210 to effect the transaction. As an incentive to cryptographically solve blocks—which consumes electricity and computing resources—select nodes 202, 204, 206, 208 can earn at least a part of a token hosted on the distributed ledger 210 (e.g., a cryptocurrency) and/or a fee for participating in the validation of the block.

As such, it shall be appreciated that the distributed ledger 210—and more generally, the blockchain network 107—of FIG. 2 can be used to track transactions and ownership of any number of digital assets, including cryptocurrencies and NFTs traded by one or more users 102 (FIG. 1) via the cryptocurrency exchange 104 (FIG. 1). In short, the blockchain network 107 can be configured to interface with the cryptocurrency exchange 104 of FIG. 1, such that users 102 (FIG. 1) can acquire and exchange digital assets on the blockchain network 107 via the cryptocurrency exchange 104 (FIG. 1). Moreover, because the payment network 105 (FIG. 1) can be specifically configured to interface with the cryptocurrency exchange 104 (FIG. 1) via an API, the payment network 105 can be leveraged to facilitate communications on behalf of the user 102 (FIG. 1) via the computing device 101 (FIG. 1). As will be explained in further detail with reference to FIG. 3, this can be particularly beneficial because the payment network 105 (FIG. 1) can access user identifying information (e.g., KYC documents) that has already been authenticated by either the payment network 105 (FIG. 1) itself, or a third party, such as the issuer system 106 (FIG. 1). Therefore, the system 100 can improve the efficiency by which the user 102 (FIG. 1) can access the cryptocurrency exchange 104 (FIG. 1) and begin trading digital assets via the blockchain network 107 of FIG. 2.

Figure 3:
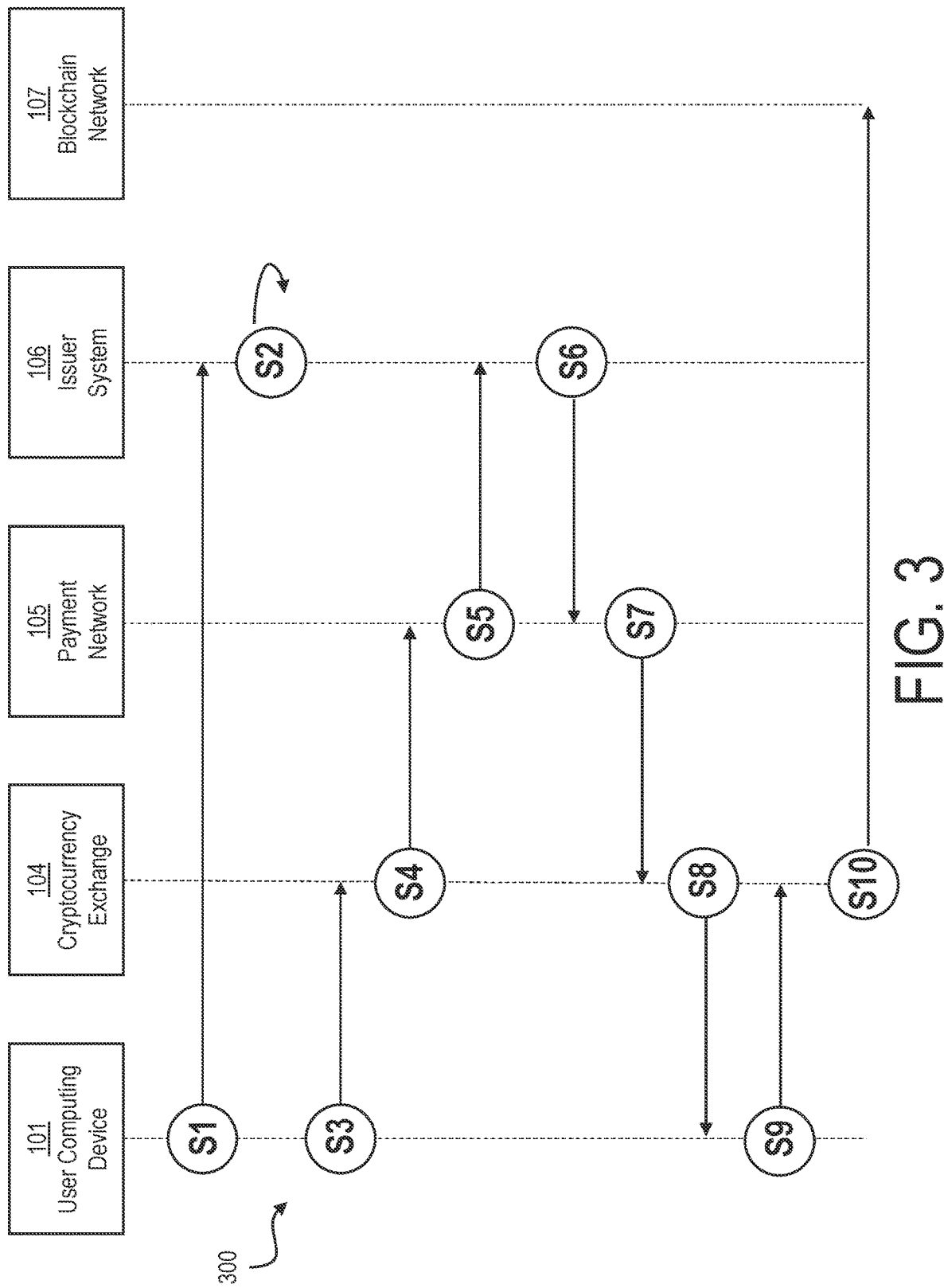
FIG. 3 illustrates a swim-lane diagram of a method of authenticating a user account for transacting on a cryptocurrency exchange via the system of FIG. 1, in accordance with at least one non-limiting aspect of the present disclosure.

Referring now to FIG. 3, a swim-lane diagram of a method 300 of authenticating a user 102 (FIG. 1) account for transacting on a cryptocurrency exchange 104 using the system 100 of FIG. 1 is depicted in accordance with at least one non-limiting aspect of the present disclosure. According to the non-limiting aspect of FIG. 3, the method 300 can include the user 102 (FIG. 1) establishing an account with the issuer system 106 via the computing device 101, as illustrated via S1. As previously described, the issuer system 106 can include one or more entities that provide one or more accounts (e.g., a credit account, a debit account, a credit card account, a debit card account, etc.) to the user 102 (FIG. 1) for conducting transactions, such as initiating credit and/or debit payments. Thus, the issuer system 106 will require the submission of user identifying information (e.g., KYC documents, etc.), which is verified and stored at S2.

According to the non-limiting aspect of FIG. 3, at S3, the method 300 can further include the user 102 (FIG. 1) attempting to establish an account on a cryptocurrency exchange 104. As such, the user 102 (FIG. 1) can, based on user input, access the aforementioned API via a cryptocurrency exchange 104 application or website on the computing device 101—as will be described in further detail in reference to FIGS. 5A-C—to initiate the provision of customer identifying information to the cryptocurrency exchange 104. In response to the request, at S4, the method 300 can include the cryptocurrency exchange 104 communicating with the payment network 500 at S4 and the payment network 500 subsequently requesting the previously authenticated and stored user identifying information from the issuer system 106 at S5. At S6, the issuer system 106 sends the previously authenticated and stored user identifying information to the payment network 105. However, according to other non-limiting aspects, the user identifying information can be stored on another, non-issuer system 106, third party server (e.g., a governmental server that issued the user identifying information, etc.). According to still other non-limiting aspects, the user identifying information can be stored on a server of the payment network 105. At S7, the method 300 can include the payment network 105 sending a confirmation of the previously authenticated and stored user identifying information to the cryptocurrency exchange 104 via the API. Thus, the payment network 105 can provide a quick and, according to some non-limiting aspects, relatively instantaneous approval of the account of the user 102 (FIG. 1). At S8, the cryptocurrency exchange 104 can send a confirmation of account authentication to the computing device 101. Accordingly, at S9, the computing device 101 can access the cryptocurrency exchange 104, which can execute transactions associated with digital assets on the blockchain network 107 on behalf of the user 102 (FIG. 1), as depicted at S10.

Figure 4:
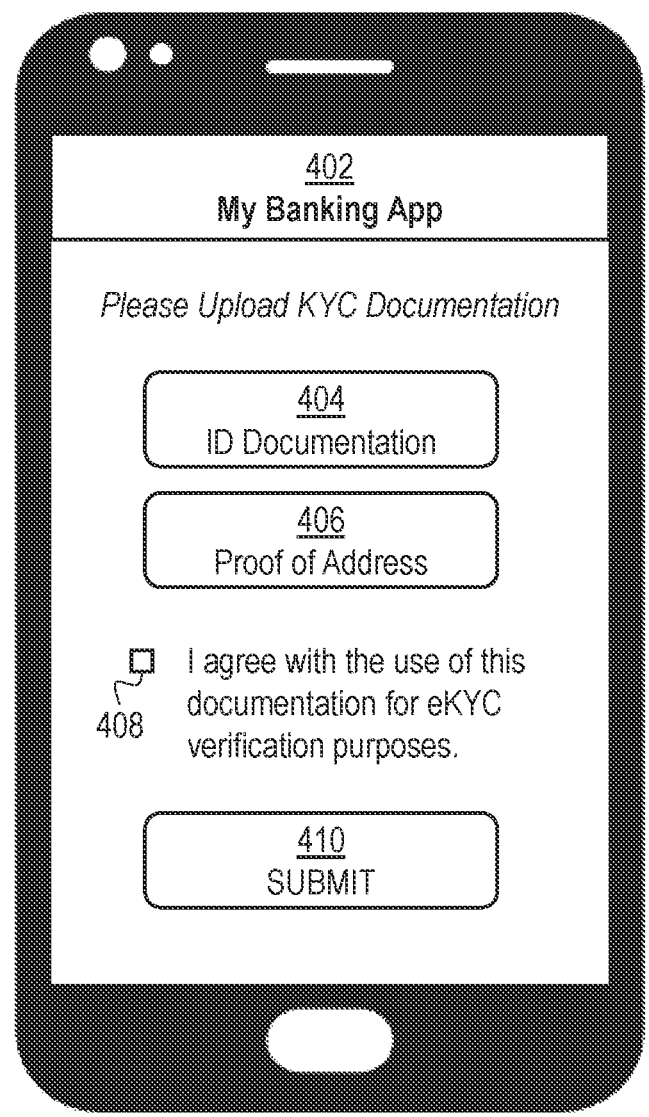
FIG. 4 illustrates a user interface configured to be presented by a computing device of a user of the system of FIG. 1, in accordance with at least one non-limiting aspect of the present disclosure.

Referring now to FIG. 4, a user interface 402 configured to be presented by the computing device 101 of a user 102 (FIG. 1) of the system of FIG. 1 is depicted in accordance with at least one non-limiting aspect of the present disclosure. Although the computing device 101 of FIG. 4 depicts a smartphone, it shall be appreciated that, according to other non-limiting aspects, a similar user interface 402 can be displayed via a number of computing devices 101, including personal computers, laptop computers, stand-alone displays, tablets, and/or smart watches, amongst others. According to the non-limiting aspect of FIG. 4, the user interface 402 can be configured for display via an application and/or website either controlled or hosted by the issuer system 106 (FIG. 1) of the system 100 of FIG. 1. The user interface 402 of FIG. 4 can prompt the computing device 101 (FIG. 1) to upload identifying information. For example, the user interface 402 can include a first widget 404 by which the user 102 (FIG. 1), via the computing device 101, can upload identifying documentation (e.g., voter identification cards, passports, drivers' licenses, government issued photo identification card, etc.) to a server of the issuer system 106 (FIG. 1). Additionally, the user interface 402 can include a second widget 406 by which the user 102 (FIG. 1) can upload documentation that proves an address of the user 102 (FIG. 1) (e.g., bills, bank statements, voter identification cards, passports, drivers' licenses, government issued photo identification card, etc.) to a server of the issuer system 106 (FIG. 1).

In further reference to FIG. 4, the user interface 402 can further include a checkbox 408, indicating that the user 102 (FIG. 1) intends for this documentation to be available for an electronic user authentication service provided via the system 100 of FIG. 1. Assuming the user 102 (FIG. 1) checks this box, the issuer system 106 (FIG. 1) will make the documentation uploaded via the first widget 404 and/or the second widget 406 available for the electronic user authentication service provided via the system 100 of FIG. 1. Specifically, the issuer system 106 (FIG. 1) can make the documentation available to the payment network 105 of the system 100 of FIG. 1, such that the payment network 105 can provide the documentation to the cryptocurrency exchange 104 (FIG. 1), as depicted and describe in reference to the method 300 of FIG. 3. The user interface 402 of FIG. 4 can further include a button 410 by which the user 102 (FIG. 1), via the computing device 101, can submit the documentation they uploaded via the first widget 404 and/or the second widget 406 to the issuer system 106 (FIG. 1). The submission of such documentation may be required for the authorization and/or issuance of a payment credential (e.g., a debit card, a credit card, etc.) by the issuer system 106 (FIG. 1).

Although FIG. 4 depicts a user interface 402 configured for display via an application and/or website either controlled or hosted by the issuer system 106 (FIG. 1) of the system 100 of FIG. 1, it shall be appreciated that, according to the present disclosure, the issuer system 106 (FIG. 1) can receive user authenticating documentation in any number of ways. For example, according to some non-limiting aspects, the issuer system 106 can receive authenticating documentation from the user 102 (FIG. 1) personally via a physical location. The user 102 (FIG. 1), for example, may provide the issuer system 106 (FIG. 1) with authenticating documentation when opening a bank account or applying for a loan or credit card. According to other non-limiting aspects, the issuer system 106 can receive authenticating documentation from a third party on behalf of the user 102 (FIG. 1). Regardless, the issuer system 106 can receive and store user authenticating documentation for an initial use and subsequently, for use via the system 100 of FIG. 1.

Figure 5C:
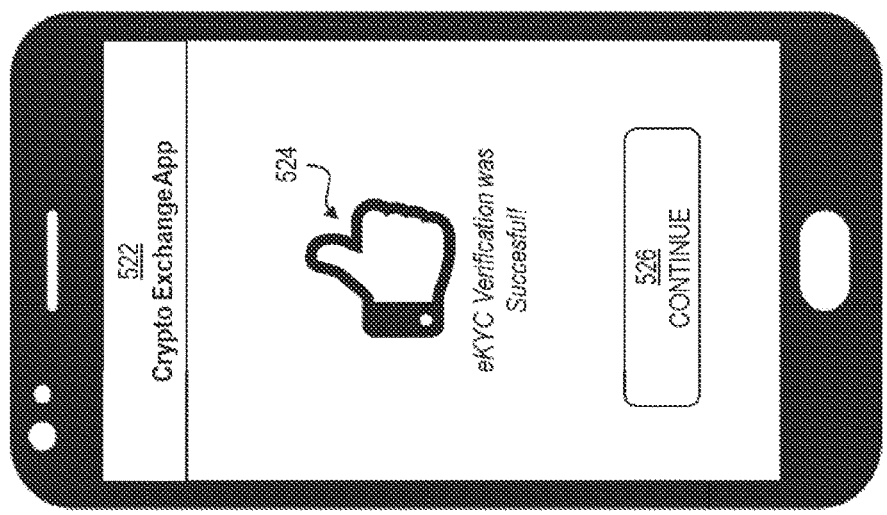
FIGS. 5A-C illustrate several other user interfaces configured to be presented by a computing device of a user of the system of FIG. 1, in accordance with at least one non-limiting aspect of the present disclosure.
Figure 5B:
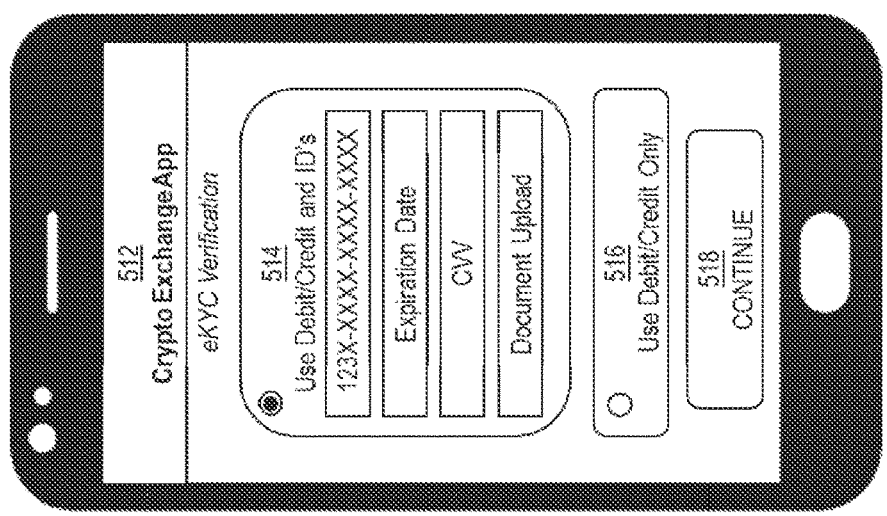
Figure 5A:
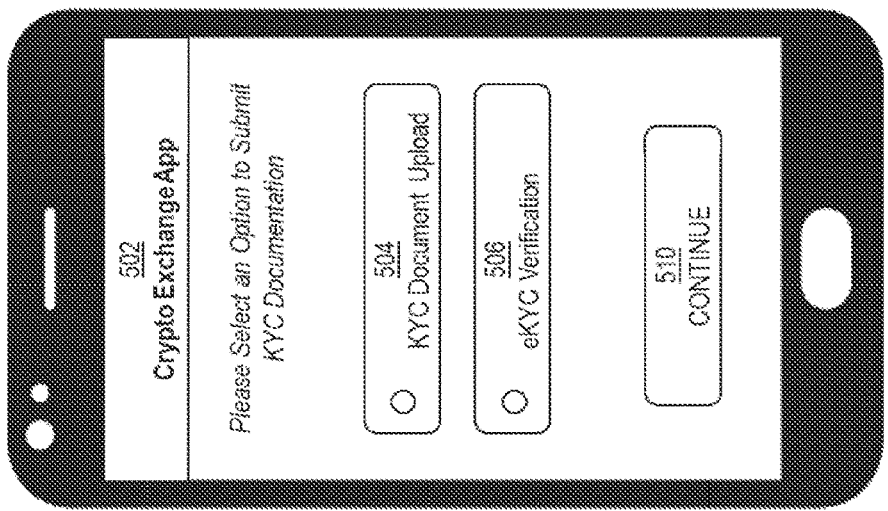

Referring now to FIGS. 5A-C, several user interfaces 502, 512, 522 are configured to be presented by the computing device 101 of a user of the system 100 of FIG. 1 are depicted in accordance with at least one non-limiting aspect of the present disclosure. According to the non-limiting aspect of FIGS. 5A-C, the user interfaces 502, 512, 522 can be configured for display via an application and/or website either controlled or hosted by the cryptocurrency exchange 104 (FIG. 1) but can communicated with the system 100 via an integrated API, hosted and controlled by the payment network 105 (FIG. 1). With specific reference to FIG. 5A, the computing device 101 causes a first user interface 502 to present the user 102 (FIG. 1) with options to authenticate their account on the cryptocurrency exchange 104 (FIG. 1). For example, the user interface 502 of FIG. 5A can include a first widget 504 prompting the user 102 (FIG. 1) to upload identifying documentation via a traditional user authentication process and a second widget 506 prompting the user 102 (FIG. 1) to authenticate their account via the electronic user authentication service provided via the system 100 of FIG. 1. Assuming the user 102 (FIG. 1) opts to authenticate their account via the electronic user authentication service provided via the system 100 of FIG. 1 via the second widget 506, they can engage with a first button 510 to continue the account authentication process. Alternatively, the selection can automatically transfer to the next part of the process. However, according to some non-limiting aspects, the user 102 (FIG. 1) can request that the identifying information be directly transmitted, at request of the user device 101, from payment network 105 (FIG. 1) to the cryptocurrency exchange 104 (FIG. 1) without first going to the computing device 101.

Referring now to FIG. 5B, a second user interface 512 configured to be presented by the computing device 101 is depicted in accordance with at least one non-limiting aspect of the present disclosure. The computing device 101 can present the second user interface 512 after the user engages with the first button 510 to continue the account authentication process. The second user interface 512 can include several options to authenticate their account on the cryptocurrency exchange 104 (FIG. 1) via the electronic user authentication service provided via the system 100 of FIG. 1. For example, the user interface 512 can include a third widget 514 that enables the user 102 (FIG. 1) to authenticate the account via a pre-existing account or payment credential (e.g., debit card, credit card, etc.) as well as identifying documentation and a fourth widget 516 that enables the user 102 (FIG. 1) to authenticate the account via just a debit or credit card.

Presentation of the third and/or fourth widgets 514, 516 can vary depending on user preference and/or intended application. For example, if the cryptocurrency exchange 104 (FIG. 1) or any other entity requires supplemental information beyond what may be available via the electronic user authentication service provided via the system 100 of FIG. 1, then the third widget 514 may be preferable. Additionally and/or alternately, supplemental information may be required by jurisdiction, as laws and regulations of varying governments may necessitate the use of the first widget 514. Nonetheless, once either the third widget 514 or fourth widget 516 is selected, the user interface 512 can present several form fields by which the user 102 (FIG. 1) can either enter or confirm information associated with payment credential (e.g., debit card, credit card, etc.). However, according to other non-limiting aspects, any other account (e.g., bank account, loan, customer loyalty, etc.) hosted by the issuer system 106 can be used to authenticate the user 102 (FIG. 1). For example, according to the non-limiting aspect of FIG. 5B, the user interface 512 can present form fields associated with an account number, expiration date, and/or security code associated with the payment credential (e.g., debit card, credit card, etc.), along with a field by which the user 102 (FIG. 1) can attach and upload supplemental documentation. Once the user 102 (FIG. 1) has entered and/or confirmed the account information in each field, the user 102 (FIG. 1) can engage with a second button 518 to continue the account authentication process. Alternatively, the selection can automatically transfer to the next part of the process.

In reference to FIG. 5C, a third user interface 522 configured to be presented by the computing device 101 is depicted in accordance with at least one non-limiting aspect of the present disclosure. The computing device 101 can present the third user interface 522 after the user engages with the second button 518 to continue the account authentication process. According to the non-limiting aspect of FIG. 5C, the third user interface 522 can include a notification 524 that the electronic user authentication service provided via the system 100 of FIG. 1 was successful. In other words, based on the information provided via the second user interface 512 of FIG. 5B, the payment network 105 (FIG. 1) was able to retrieve the requisite user identifying information of the user 102 (FIG. 1) from the issuer system 106 (FIG. 1) and provide it to the cryptocurrency exchange 104 (FIG. 1) for a relatively instantaneous authentication of the user 102 (FIG. 1) account.

Since the cryptocurrency exchange 104 (FIG. 1) trusts the payment network 105 (FIG. 1) and its relationship with the issuer system 106 (FIG. 1), the cryptocurrency exchange 104 (FIG. 1) has confidence that the identifying information provided by the payment network 105 (FIG. 1) was previously authenticated and stored by the issuer system 106 (FIG. 1). Thus, having been authenticated, the user 102 (FIG. 1) can engage with a third button 526 to continue on to the cryptocurrency exchange 104 (FIG. 1) to acquire and trade digital assets hosted on the blockchain network 107 (FIGS. 1 and 2). Alternatively, upon authentication via the payment network 105 (FIG. 1), the computing device 101 can automatically take the user 102 (FIG. 1) to another user interface of the cryptocurrency exchange 104, by which the user 102 (FIG. 1) can perform acquisitions and trades. Accordingly, the two or three day authentication process required by most cryptocurrency exchanges 104 (FIG. 1) can be substantially reduced, while preserving compliance to KYC policies and regulations. In other words, the system 100 (FIG. 1) can rapidly onboard a user 102 (FIG. 1) for access to trade on a cryptocurrency exchange, relative to conventional systems and processes.

Figure 6:
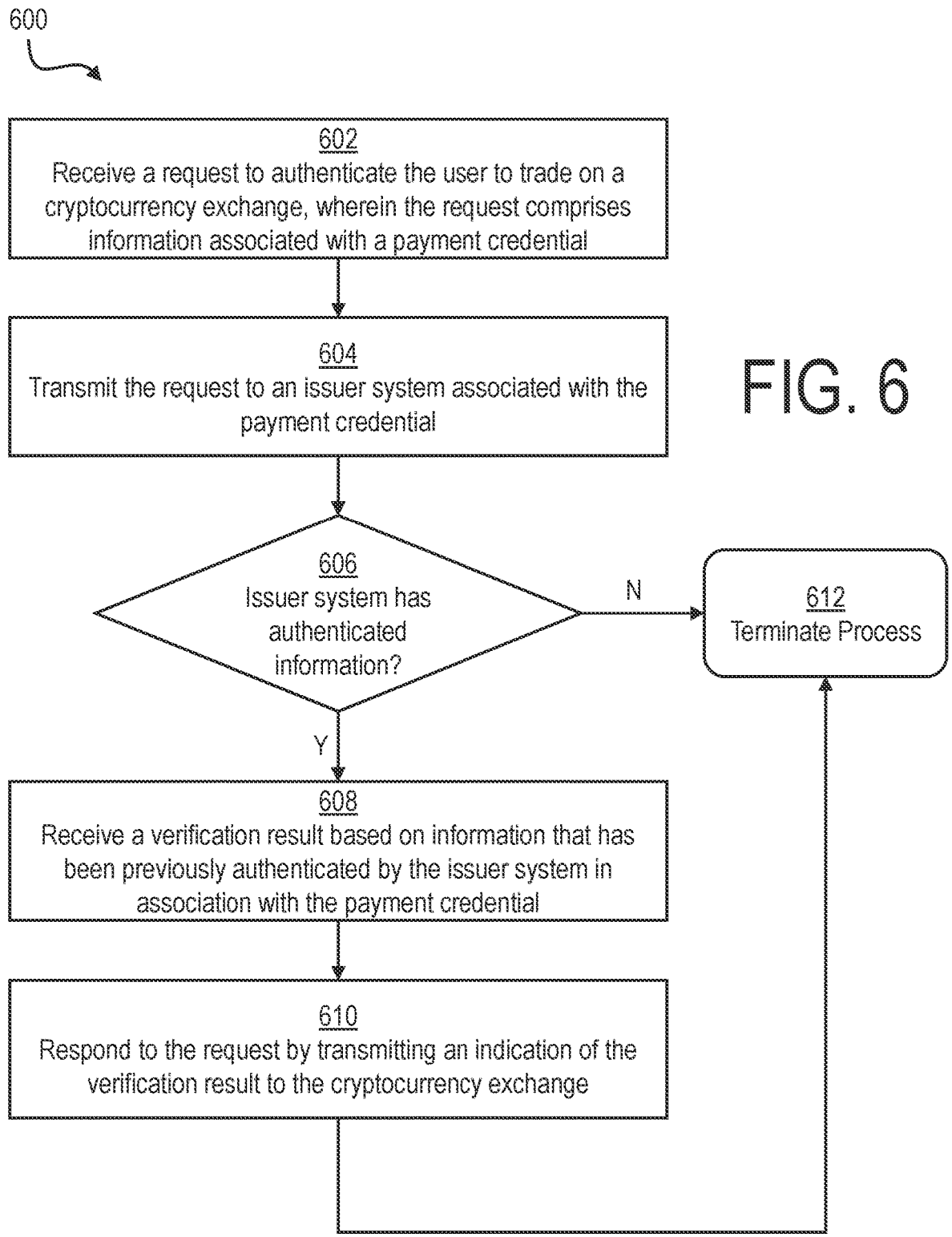
FIG. 6 illustrates a logic flow diagram of a method of authenticating a user account for transacting on a cryptocurrency exchange via the system of FIG. 1, in accordance with at least one non-limiting aspect of the present disclosure.

Referring now to FIG. 6, a logic flow diagram of a method 600 of authenticating a user 102 (FIG. 1) account for transacting on a cryptocurrency exchange 104 (FIG. 1) via the system 100 of FIG. 1 is depicted in accordance with at least one non-limiting aspect of the present disclosure. For example, the method 600 can be executed by the payment network 105 that, as depicted in FIG. 1, is configured to interface not only with the cryptocurrency exchange 104, but also with the user 102 via the computing device 101 and the issuer system 106. As previously discussed, such communications can be facilitated by an API hosted by the payment network 105 and integrated into applications and/or websites accessed by the computing device 101 (FIG. 1).

According to the non-limiting aspect of FIG. 6, the method 600 can include receiving 602 a request to authenticate the user for access to trade on the cryptocurrency exchange 104 (FIG. 1). The request, for example, can be originated from an application and/or website accessed by the user 102 (FIG. 1) via the computing device 101 (FIG. 1), as previously described in reference to FIG. 5A. The request can include information associated with an account of the user 102 (FIG. 1) hosted by an issuer system 106 of the system of FIG. 1. For example, the request can include information associated with a payment credential (e.g., debit card, credit card, etc.) of the user 102 (FIG. 1) issued by the issuer system 106 (FIG. 1) and configured for use via transactions authorized via the payment network 105 (FIG. 1). In response to the request, the method 600 can further include transmitting 604 the request to the issuer system 106 (FIG. 1), which, as previously discussed, is associated with the account and/or payment credential.

The method 600 of FIG. 6 can further include determining 606 whether the issuer system has stored information associated with the user 102 (FIG. 1) that was previously authenticated in association with the account and/or payment credential of the user 102 (FIG. 1). For example, the information can include KYC documents that were previously authenticated and stored by the issuer system 106

(FIG. 1) in association with the establishment of another account for the user 102 (FIG. 1). In other words, as was previously described in reference to FIG. 4, the method 600 can assess whether the user 102 (FIG. 1) previously submitted identifying information to the issuer system 106 for verification while establishing an preexisting account with the issuer system 106 (FIG. 1). According to some non-limiting aspects, the determination 606 can further include determining whether the user 102 (FIG. 1) authorized that information to be used via the electronic user authentication service provided via the system 100 of FIG. 1.

Still referring to the non-limiting aspect of FIG. 6, if the payment network 105 (FIG. 1) determines that the issuer system 106 (FIG. 1) has not stored previously authenticated information, the method 600 can include terminating the process. However, assuming the payment network 105 (FIG. 1) determines that the issuer system 106 (FIG. 1) has stored previously authenticated information, the method can include receiving 608 a verification result based on the previously stored information. The verification result, for example, can be based on the information the issuer system has previously authenticated in association with the payment credential. Moreover, the verification result can be indicative of an authenticity status of the user. In other words, if the payment network 105 (FIG. 1) determines that the issuer system 106 (FIG. 1) has stored previously authenticated information, a positive authenticity status can be attached to the verification result. Accordingly, the method 600 can further include responding to the request by transmitting an indication of the verification result to the cryptocurrency exchange 104 (FIG. 1). Once again, the two or three day authentication process required by most cryptocurrency exchanges 104 (FIG. 1) can be substantially reduced by the method 600 of FIG. 6, while preserving compliance to KYC policies and regulations. In other words, the method 600 of FIG. 6 can rapidly onboard a user 102 (FIG. 1) for access to trade on a cryptocurrency exchange, relative to conventional systems and processes. According to some non-limiting aspects, instead of terminating 612 the process, the method 600 can further include prompting a transitional authentication of the user, which may require the provision of supplemental information. The supplemental information can include KYC information.

Figure 7:
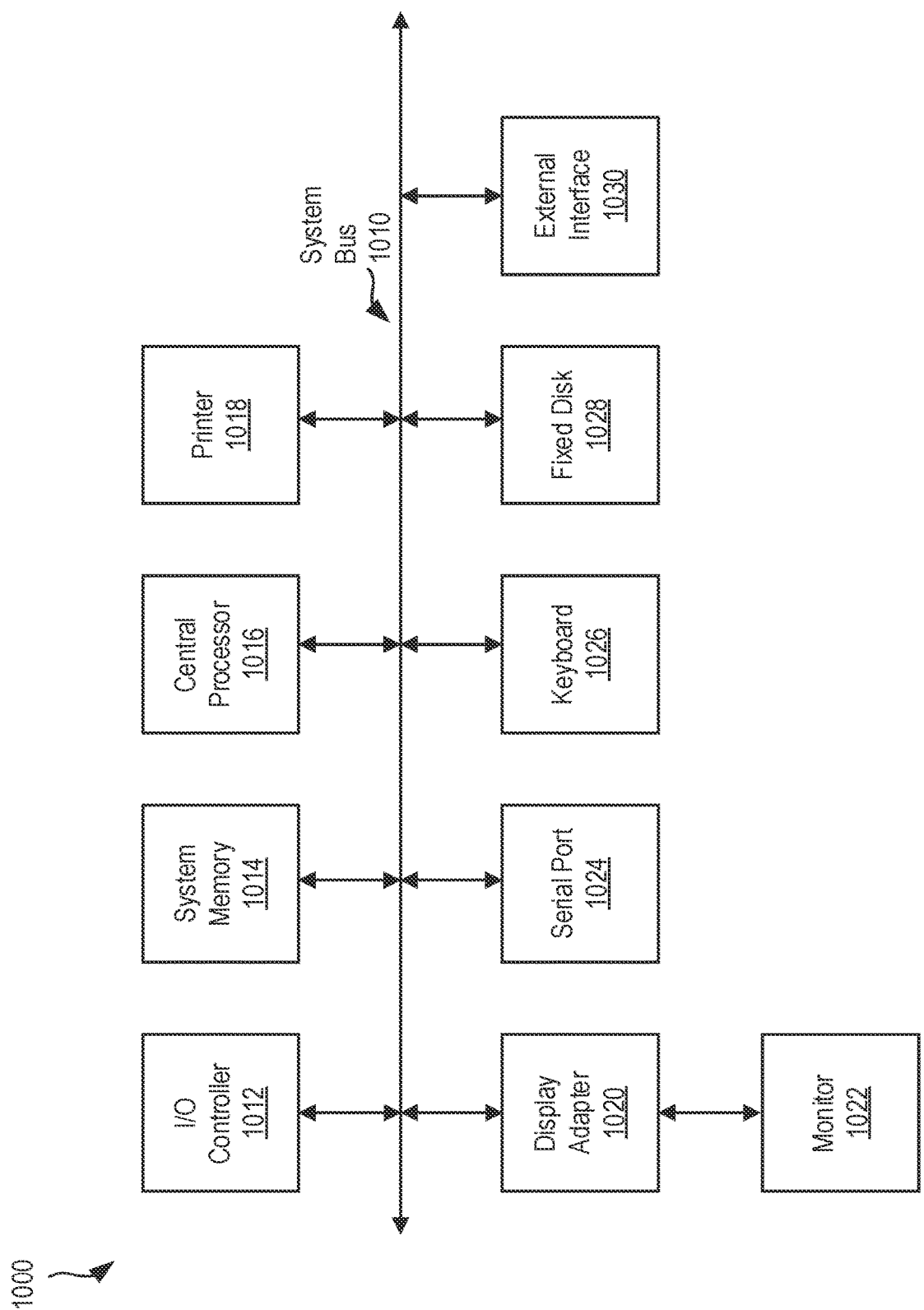
FIG. 7 illustrates a block diagram of a computer apparatus, according to at least aspect of the present disclosure.

The system and system components described herein with reference to FIGS. 1 and 2 may operate via one or more computer apparatuses to facilitate the functions described herein. Further, the one or more computer apparatuses may use any suitable number of subsystems to facilitate the functions described herein. Examples of such subsystems or components are shown in FIG. 7. The subsystems 1000 shown in FIG. 7 are interconnected via a system bus 1010. Additional subsystems such as a printer 1018, keyboard 1026, fixed disk 1028 (or other memory comprising computer readable media), monitor 1022, which is coupled to display adapter 1020, and others are shown. Peripherals and input/output (I/O) devices, which couple to I/O controller 1012 (which can be a processor or other suitable controller), can be connected to the computer system by any number of means known in the art, such as serial port 1024. For example, serial port 1024 or external interface 1030 can be used to connect the computer apparatus to a wide area network such as the Internet, a mouse input device, or a scanner. The interconnection via system bus 1010 allows the central processor 1016 to communicate with each subsystem and to control the execution of instructions from system memory 1014 or the fixed disk 1028, as well as the exchange of information between subsystems. The system memory 1014 and/or the fixed disk 1028 may embody a computer readable medium.

Figure 8:
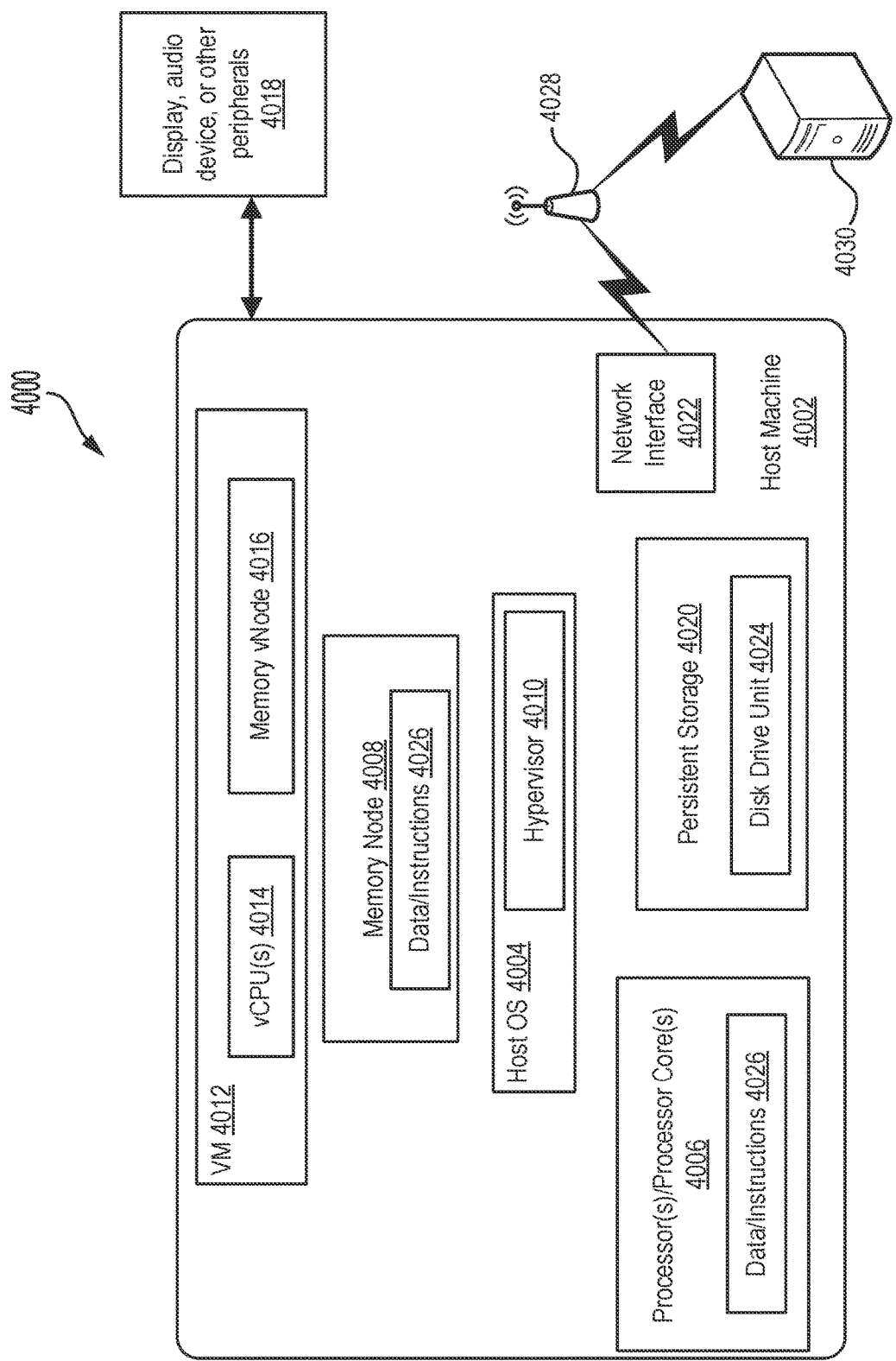
FIG. 8 illustrates a diagrammatic representation of an example system that includes a host machine within which a set of instructions to perform any one or more of the methodologies discussed herein may be executed, according to at least one aspect of the present disclosure.

Referring now to FIG. 8, a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system 4004 (OS) on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node of the memory nodes 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the devices, systems, and methods disclosed herein, according to various aspects of the present disclosure, are provided below in the following numbered clauses. An aspect of the devices, systems, and methods may include any one or more than one, and any combination of, the numbered clauses described below.

Various aspects of the subject matter described herein are set out in the following numbered clauses:

Clause 1: A method of rapidly onboarding a user for access to trade on a cryptocurrency exchange, the method including receiving, via a payment network, an application program interface ("API") call including a request to authenticate the user for access to trade on the cryptocurrency exchange, wherein the request includes information associated with an account of the user, transmitting, via the payment network, the request to an issuer system associated with the account, receiving, via the payment network, a verification result from the issuer system, wherein the verification result is based on user identifying information previously authenticated by the issuer system in association with the account, wherein the verification result is indicative of an authenticity status of the user, and responding, via the payment network, to the request by transmitting an indication of the verification result to the cryptocurrency exchange.

Clause 2. The method according to clause 1, wherein the user identifying information previously authenticated by the issuer system includes know your customer ("KYC") information.

Clause 3. The method according to either of clauses 1 and 2, wherein the KYC information includes at least one of a voter identification card, a passport, a driver's license, and a government issued photo identification card, or combinations thereof.

Clause 4. The method according to any of clauses 1-3, wherein the account is associated with a payment credential of the user, wherein the payment credential was previously issued by the issuer system based, at least in part, on the user identifying information previously authenticated by the issuer system.

Clause 5. The method according to any of clauses 1-4, wherein the account is associated with a bank account of the user, wherein the bank account was previously established by the issuer system based, at least in part, on the user identifying information previously authenticated by the issuer system.

Clause 6. The method according to any of clauses 1-5, wherein the account is associated with a loan of the user, wherein the loan was previously granted by the issuer system based, at least in part, on the user identifying information previously authenticated by the issuer system.

Clause 7. The method according to any of clauses 1-6, further including receiving, via the payment network, a confirmation that the user had previously authorized the user identifying information previously authenticated by the issuer system to be used for alternate verification purposes.

Clause 8. A payment network configured to rapidly onboard a user for access to trade on a cryptocurrency exchange, the payment network including a processor, and a memory configured to store an application program interface ("API") and instructions that, when executed by the processor, cause the payment network to receive an API call including a request to authenticate the user for access to trade on the cryptocurrency exchange, wherein the request includes information associated with an account of the user, wherein the account is associated with the payment network, transmit the request to an issuer system associated with the account, receive a verification result from the issuer system, wherein the verification result is based on user identifying information previously authenticated by the issuer system in association with the account, wherein the verification result is indicative of an authenticity status of the user, receive a confirmation that the user had previously authorized the previously authenticated user identifying information to be used for alternate verification purposes, and respond to the request by transmitting an indication of the verification result to the cryptocurrency exchange.

Clause 9. The payment network according to clause 8, wherein the user identifying information previously authenticated by the issuer system includes know your customer ("KYC") information.

Clause 10. The payment network according to either of clauses 8 or 9, wherein the KYC information includes at least one of a voter identification card, a passport, a driver's license, and a government issued photo identification card, or combinations thereof.

Clause 11. The payment network according to any of clauses 8-10, wherein the account is associated with a payment credential of the user, wherein the payment credential was previously issued by the issuer system based, at least in part, on the user identifying information previously authenticated by the issuer system.

Clause 12. The payment network according to any of clauses 8-11, wherein the account is associated with a bank account of the user, wherein the bank account was previously established by the issuer system based, at least in part, on the user identifying information previously authenticated by the issuer system.

Clause 13. The payment network according to any of clauses 8-12, wherein the account is associated with a loan of the user, wherein the loan was previously granted by the issuer system based, at least in part, on the user identifying information previously authenticated by the issuer system.

Clause 14. A system configured to rapidly onboard a user for access to trade on a cryptocurrency exchange, the system including a computing device, and a payment network including a processor, and a memory configured to store an application program interface ("API") configured to communicate with the computing device and instructions that, when executed by the processor, cause the payment network to receive an API call including a request to authenticate the user for access to trade on the cryptocurrency exchange from the computing device, wherein the request includes information associated with an account of the user, wherein the account is associated with the payment network, transmit the request to an issuer system associated with the account, receive a verification result from the issuer system, wherein the verification result is based on user identifying information previously authenticated by the issuer system in association with the account, wherein the verification result is indicative of an authenticity status of the user, and respond to the request by transmitting an indication of the verification result to the cryptocurrency exchange.

Clause 15. The system according to clause 14, wherein the user identifying information previously authenticated by the issuer system includes know your customer ("KYC") information.

Clause 16. The system according to either of clauses 14 or 15, wherein the KYC information includes at least one of a voter identification card, a passport, a driver's license, and a government issued photo identification card, or combinations thereof.

Clause 17. The system according to any of clauses 14-16, wherein the account is associated with a payment credential of the user, wherein the payment credential was previously issued by the issuer system based, at least in part, on the user identifying information previously authenticated by the issuer system.

Clause 18. The system according to any of clauses 14-17, wherein the account is associated with a bank account of the user, wherein the bank account was previously established by the issuer system based, at least in part, on the user identifying information previously authenticated by the issuer system.

Clause 19. The system according to any of clauses 14-18, wherein the account is associated with a loan of the user, wherein the loan was previously granted by the issuer system based, at least in part, on the previously authenticated user identifying information.

Clause 20. The system according to any of clauses 14-19, wherein, when executed by the processor, the instructions stored by the memory further cause the payment network to receive a confirmation that the user had previously authorized the user identifying information previously authenticated by the issuer system to be used for alternate verification purposes.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

All patents, patent applications, publications, or other disclosure material mentioned herein, are hereby incorporated by reference in their entirety as if each individual reference was expressly incorporated by reference respectively. However, none of the patents, patent applications, publications, or other disclosure material mentioned herein are admitted to be prior art. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

What is claimed is:

1. A method of rapidly onboarding a user for access to trade on a cryptocurrency exchange, the method comprising:
    establishing an account with an issuer system, wherein the account is associated with a user, wherein the issuer system is separate from the cryptocurrency exchange;
    submitting user identifying information to the issuer system, wherein the user is authenticated by the issuer system;
    prior to authentication of the user on the cryptocurrency exchange, receiving, via a payment network, an application program interface ("API") call comprising a request to authenticate the user for access to trade on the cryptocurrency exchange, wherein the request comprises information associated with the account of the user;
    based on determining to authenticate the user on the cryptocurrency exchange using the authentication of the user by the issuer system, transmitting, via the payment network, the request to an issuer system associated with the account;
    receiving, via the payment network, a verification result from the issuer system, wherein the verification result is based on the user identifying information previously authenticated by the issuer system in association with the account, wherein the verification result is indicative of an authenticity status of the user;
    responding, via the payment network, to the request by transmitting an indication of the verification result to the cryptocurrency exchange; and
    executing a transaction to perform a trade or acquisition on the payment network with the cryptocurrency exchange.

2. The method of claim 1, wherein the user identifying information previously authenticated by the issuer system comprises know your customer ("KYC") information, wherein the KYC information comprises at least one of a voter identification card, a passport, a driver's license, and a government issued photo identification card, or combinations thereof.

3. The method of claim 1, wherein the account is associated with a payment credential of the user, wherein the payment credential was previously issued by the issuer system based, at least in part, on the user identifying information previously authenticated by the issuer system.

4. The method of claim 1, wherein the account is associated with a bank account of the user, wherein the bank account was previously established by the issuer system based, at least in part, on the user identifying information previously authenticated by the issuer system.

5. The method of claim 1, wherein the account is associated with a loan of the user, wherein the loan was previously granted by the issuer system based, at least in part, on the user identifying information previously authenticated by the issuer system.

6. The method of claim 1, further comprising receiving, via the payment network, a confirmation that the user had previously authorized the user identifying information previously authenticated by the issuer system to be used for alternate verification purposes.

7. The method of claim 1, comprising determining, via the payment network, the issuer system has stored previously authenticated information associated with the account, and wherein receiving the verification result from the issuer system is based on the issuer system having stored previously authenticated information.

8. A payment network configured to rapidly onboard a user for access to trade on a cryptocurrency exchange, the payment network comprising: a processor;
    and a memory configured to store an application program interface ("API") and instructions that, when executed by the processor, cause the payment network to:
    establish an account with an issuer system, wherein the account is associated with a user, wherein the issuer system is separate from the cryptocurrency exchange;
    submit user identifying information to the issuer system, wherein the user is authenticated by the issuer system;
    prior to authentication of the user on the cryptocurrency exchange, receive an API call comprising a request to authenticate the user for access to trade on the cryptocurrency exchange, wherein the request comprises information associated with an account of the user, wherein the account is associated with the payment network;

based on determining to authenticate the user on the cryptocurrency exchange using the authentication of the user by the issuer system, transmit the request to an issuer system associated with the account;

receive a verification result from the issuer system, wherein the verification result is based on user identifying information previously authenticated by the issuer system in association with the account, wherein the verification result is indicative of an authenticity status of the user;

receive a confirmation that the user had previously authorized the user identifying information previously authenticated by the issuer system to be used for alternate verification purposes;

respond to the request by transmitting an indication of the verification result to the cryptocurrency exchange; and execute a transaction to perform a trade or acquisition on the payment network with the cryptocurrency exchange.

9. The payment network of claim 8, wherein the user identifying information previously authenticated by the issuer system comprises know your customer ("KYC") information.

10. The payment network of claim 9, wherein the KYC information comprises at least one of a voter identification card, a passport, a driver's license, and a government issued photo identification card, or combinations thereof.

11. The payment network of claim 8, wherein the account is associated with a payment credential of the user, wherein the payment credential was previously issued by the issuer system based, at least in part, on the user identifying information previously authenticated by the issuer system.

12. The payment network of claim 8, wherein the account is associated with a bank account of the user, wherein the bank account was previously established by the issuer system based, at least in part, on the user identifying information previously authenticated by the issuer system.

13. The payment network of claim 8, wherein the account is associated with a loan of the user, wherein the loan was previously granted by the issuer system based, at least in part, on the user identifying information previously authenticated by the issuer system.

14. A system configured to rapidly onboard a user for access to trade on a cryptocurrency exchange, the system comprising:
 a computing device; and
 a payment network comprising:
 a processor; and
 a memory configured to store an application program interface ("API") configured to communicate with the computing device and instructions that, when executed by the processor, cause the payment network to:

establish an account with an issuer system, wherein the account is associated with a user, wherein the issuer system is separate from the cryptocurrency exchange;

submit user identifying information to the issuer system, wherein the user is authenticated by the issuer system;

prior to authentication of the user on the cryptocurrency exchange, receive an API call comprising a request to authenticate the user for access to trade on the cryptocurrency exchange from the computing device, wherein the request comprises information associated with an account of the user, wherein the account is associated with the payment network;

based on determining to authenticate the user on the cryptocurrency exchange using the authentication of the user by the issuer system, transmit the request to an issuer system associated with the account;

receive a verification result from the issuer system, wherein the verification result is based on the user identifying information previously authenticated by the issuer system in association with the account, wherein the verification result is indicative of an authenticity status of the user;

respond to the request by transmitting an indication of the verification result to the cryptocurrency exchange; and execute a transaction to perform a trade or acquisition on the payment network with the cryptocurrency exchange.

15. The system of claim 14, wherein the user identifying information previously authenticated by the issuer system comprises know your customer ("KYC") information.

16. The system of claim 15, wherein the KYC information comprises at least one of a voter identification card, a passport, a driver's license, and a government issued photo identification card, or combinations thereof.

17. The system of claim 14, wherein the account is associated with a payment credential of the user, wherein the payment credential was previously issued by the issuer system based, at least in part, on the user identifying information previously authenticated by the issuer system.

18. The system of claim 14, wherein the account is associated with a bank account of the user, wherein the bank account was previously established by the issuer system based, at least in part, on the user identifying information previously authenticated by the issuer system.

19. The system of claim 14, wherein the account is associated with a loan of the user, wherein the loan was previously granted by the issuer system based, at least in part, on the user identifying information previously authenticated by the issuer system.

20. The system of claim 14, wherein, when executed by the processor, the instructions stored by the memory further cause the payment network to receive a confirmation that the user had previously authorized the user identifying information previously authenticated by the issuer system to be used for alternate verification purposes.

* * * * *